(12) United States Patent
Kouta et al.

(10) Patent No.: US 7,158,546 B2
(45) Date of Patent: Jan. 2, 2007

(54) COMPOSITE LASER ROD, FABRICATING METHOD THEREOF, AND LASER DEVICE THEREWITH

(75) Inventors: Hikaru Kouta, Tokyo (JP); Yoshikazu Suzuki, Tokyo (JP); Shuetsu Kudo, Tokyo (JP); Masaki Tsunekane, Tokyo (JP); Katsuji Mukaihara, Tokyo (JP); Takagimi Yanagitani, Osaka (JP); Hideki Yagi, Osaka (JP)

(73) Assignees: NEC Corporation, Tokyo (JP); Konoshima Chemical Co., Ltd., Osaka (JP)

( * ) Notice: Subject to any disclaimer, the term of this patent is extended or adjusted under 35 U.S.C. 154(b) by 133 days.

(21) Appl. No.: 10/372,836

(22) Filed: Feb. 26, 2003

(65) Prior Publication Data

US 2003/0214986 A1    Nov. 20, 2003

(30) Foreign Application Priority Data

Feb. 27, 2002   (JP) ............................. 2002-051360

(51) Int. Cl.
*H01S 3/098*  (2006.01)
*H01S 3/14*   (2006.01)

(52) U.S. Cl. .......................................... 372/19; 372/39
(58) Field of Classification Search ................. 372/19, 372/34, 35
See application file for complete search history.

(56) References Cited

U.S. PATENT DOCUMENTS

| | | | | |
|---|---|---|---|---|
| 3,766,490 A | * | 10/1973 | Strozyk | .......................... 372/68 |
| 5,441,803 A | | 8/1995 | Meissner | |
| 5,511,085 A | * | 4/1996 | Marshall | ....................... 372/22 |
| 5,563,899 A | | 10/1996 | Meissner et al. | |
| 6,330,259 B1 | * | 12/2001 | Dahm | .......................... 372/35 |
| 2004/0013151 A1 | * | 1/2004 | Sumida et al. | ................. 372/72 |

FOREIGN PATENT DOCUMENTS

| | | |
|---|---|---|
| JP | S39-15886 | 8/1939 |
| JP | 62-140483 A | 6/1987 |
| JP | S63-21240 A | 1/1988 |

(Continued)

OTHER PUBLICATIONS

D. Pelenc et al., "High slope efficiency and low threshold in a diode-pumped epitaxially grown Yb: YAG waveguide laser", *Optics Communications*, vol. 115, 1995, pp. 491-497.

(Continued)

*Primary Examiner*—Armando Rodriguez
(74) *Attorney, Agent, or Firm*—Sughrue Mion, PLLC (57) ABSTRACT

As a composite laser rod capable of satisfying the positional stability and output stability of a laser beam, a laser rod in which a laser active element is doped is intimately inserted into a hollow portion of a non-doped ceramic pipe that has a crystal structure the same as the laser rod followed by baking so as to remove a gap and strain at an interface between the laser rod and the ceramic pipe after the baking further followed by polishing a surface of the ceramic pipe to form a ceramic skin layer, and thereby a composite laser rod is formed. In the composite laser rod, an influence due to fluctuation in the cooling capacity of cooling water or a heat sink is averaged by a non-doped skin layer, temperature fluctuation of the laser rod is suppressed, and an influence of vibration from the cooling water or a cooling fan can be suppressed. When the refractive index of the laser rod is made higher than that of the ceramic pipe, a high efficiency oscillation can be realized, and furthermore when the thermal conductivity of the ceramic pipe is made higher than that of the laser rod, the thermal lens effect can be alleviated.

15 Claims, 8 Drawing Sheets

FOREIGN PATENT DOCUMENTS

| | | |
|---|---|---|
| JP | H01-257802 A | 10/1989 |
| JP | H02-310984 A | 12/1990 |
| JP | 3-230589 A | 10/1991 |
| JP | H05-175591 A | 7/1993 |
| JP | 5-235462 A | 9/1993 |
| JP | H05-267750 A | 10/1993 |
| JP | 5-286761 A | 11/1993 |
| JP | 5-294723 A | 11/1993 |
| JP | H06-279131 A | 10/1994 |
| JP | 7-38181 * | 2/1995 |
| JP | H07-321394 A | 12/1995 |
| JP | H08-213689 A | 8/1996 |
| JP | 9-172217 A | 6/1997 |
| JP | 10-67555 A | 3/1998 |
| JP | 2001-220223 A | 8/2001 |
| JP | 2002-57388 A | 2/2002 |
| JP | 2003-20288 A | 1/2003 |

OTHER PUBLICATIONS

T. Allik, et al., "Efficient diode-array pumped Nd:YAG and Nd:Lu:YAG lasers", *Optics Letters*, vol. 14, No. 2, Jan. 15, 1989.

A. Ikesue et al., "Development and Prospect of Ceramics Laser Elements", *The Review of Laser Engineering*, vol. 27, 1999, pp. 593-598, with English Abstract.

D. Pelenc et al., "High slope efficiency and low threshold in a diode-pumped epitaxially grown Yb: YAG waveguide laser", *Optics Communications*, vol. 115, 1995, pp. 491-497.

B Ferrand et al., "Growth by LPE of Nd:YAG single crystal layers for waveguide laser applications", *Journal of Crystal Growth*, vol. 128, 1993, pp. 966-969.

* cited by examiner

OUTPUT STABILITY OF 2mm DIAMETER CRYSTAL YAG LASER ROD

FIG. 4

OUTPUT STABILITY OF 3mm DAIMETER COMPOSITE YAG LASER ROD

⇩ BAKING

COMPOSITE LASER ROD, FABRICATING METHOD THEREOF, AND LASER DEVICE THEREWITH

BACKGROUND OF THE INVENTION

1. Field of the Invention

The invention relates to a composite laser rod, a fabricating method of the composite laser rod, and a laser device that uses the composite laser rod. In particular, the composite laser rod can improve deterioration of the positional stability and output stability of a laser beam that is caused by thermal fluctuation and vibration of a laser rod during laser oscillation, can enhance an absorption efficiency of light that excites the laser rod and thereby can improve the oscillation efficiency, and can enhance a cooling efficiency and thereby can suppress the thermal lens effect.

2. Description of the Related Art

For laser rods that generates laser beam that is employed in welding, boring, repairing, micro-fabrication and so on, crystalline materials are usually used. Among these, single crystals that have garnet structure such as yttrium aluminum garnet (YAG) and so on are mainly used. To the laser rod, a laser active element such as neodymium, ytterbium, thulium, and erbium is doped.

Recently, a laser material that is obtained by doping a laser active element in a transparent material of ceramic YAG that is obtained by baking powder having a YAG composition has been developed and confirmed to have the laser characteristics identical to the single crystal. For instance, Japanese Unexamined Patent Publications (JPA) H10-67555, H5-235462, H5-286761 and H5-294723 disclose that the transparent ceramic material can be obtained by baking, in a vacuum, powder having a composition of yttrium aluminum garnet (YAG).

Furthermore, in The Review of Laser Engineering, vol. 27, 1999, pp. 593–598, the laser characteristics are reported. Still furthermore, in a YAG single crystal rod, an upper limit of a concentration of Nd that can be introduced is substantially 1.3 atomic %. However, Proceedings (Digest of Technical Papers) of 21st Annual Meeting of The Laser Society of Japan (2001, pp. 40, Lecture No. 30pV3) disclose that the concentration in the ceramic YAG laser rod can be increased to 2% or more. Still furthermore, $Y_2O_3$ (yttria) or $Sc_2O_3$ that cannot be grown, according to an ordinary crystal growth method, into a crystal excellent in quality and large in size owing to a higher melting point, having thermal conductivity of substantially 20 W/mK that is substantially twice that of YAG, is promised as a laser crystal. When fine and uniform powder of the $Y_2O_3$ or $Sc_2O_3$ is baked in a vacuum, a transparent and high quality ceramic material can be obtained. It is reported in Proceedings (Digest of Technical Papers) of $22^{nd}$ Annual Meeting of the Laser Society of Japan (2002, pp. 40, Lecture No. B3-24PI2) that when Nd or Yb is doped in the ceramic material, the ceramic material can obtain laser oscillation.

The laser rod can be excited by use of a flush lamp or a laser diode from a side surface or an end surface, beam emitted therefrom is resonated in a resonator, and thereby a laser oscillation is realized. All energy of the excitation light that is absorbed by the laser active element during the laser oscillation is not converted into energy of laser beam but part thereof is converted into heat. As a result, the laser rod is heated during the laser oscillation and then a temperature is raised. When a temperature of the laser rod varies during the laser oscillation, the refractive index of the laser rod varies. As a result, such problems as that the positional stability of an oscillating laser beam may be deteriorated, and the output strength may fluctuate largely are caused. Accordingly, it is customary to bring the laser rod into close contact with water or a heat sink to cool so that the temperature of the laser rod may be maintained as constant as possible.

Since the laser rod is cooled from a surface thereof, it is inevitable that a temperature gradient in a radial direction is established. When a temperature gradient is generated in the radial direction, since the refractive index also varies according to the temperature, the laser rod exhibits an effect similar to a lens. As a result, light in the rod cannot propagate straight. In order to overcome the thermal lens effect, it is considered to cover a periphery of a single crystal laser rod in which a laser active element is doped with a non-doped single crystal layer. There are proposed several methods for fabricating this composite laser rod. For instance, a method in which a non-doped single crystal layer in which an active element is not doped is disposed around the laser rod of a single crystal in which an active element is doped according to a liquid phase epitaxial growth (LPE) method is disclosed in JP-A-62-140483. Furthermore, a method in which a laser material in which an active element is added and a laser material in which an active element is not added are laminated or thermo-compression bonded is disclosed in U.S. Pat. No. 5,441,803 and U.S. Pat. No. 5,563,899. Still furthermore, a method in which a hole is bored in a non-doped crystal and a doped crystal to be a core is inserted therein followed by integrating is disclosed in JP-A S63-085152 or JP-A H9-172217.

Recent years, higher precision and higher speed in the laser processing is in demand. For instance, there is a need of forming 1000 holes that has a size of 50 μm in a second at the precision of ±1 μm on a printed wiring board. In order to perform fine processing with high precision in such a short period of time, an improvement in the positional stability and a suppression of the fluctuation of the output strength in a single mode laser beam outputted from a laser oscillator are in demand more than ever.

For the fine processing, since a shorter laser wavelength is more suitable, in many cases, a single mode laser beam is wavelength-converted by use of a wavelength conversion element and used. The wavelength conversion efficiency varies in proportion to a square of an output of the laser beam until the conversion efficiency saturates. Accordingly, when there is a fluctuation in an output of the laser beam of a fundamental wave, the conversion efficiency may vary in proportion to a square of the fluctuation thereof. Furthermore, when an angle of light incident on a non-linear element varies, a light component whose phase matching angle cannot be attained increases. Accordingly, when the positional stability of the beam varies, an output of the wavelength converted light largely varies. From these reasons, in the case of a laser processor that employs the wavelength-converted light, the positional stability of the laser beam that is a fundamental wave has to be improved and the fluctuation of the output strength has to be lowered as large as possible.

One countermeasure to overcome the problems is to maintain a cooling power of cooling water and a heat sink that cool the laser rod at a constant level. However, since when the cooling power is controlled, a temperature at a temperature measurement point is controlled so as to be in a tolerable temperature range, it is impossible to set this temperature range at ±0 degree centigrade. Furthermore, in particular when the cooling water is used, since once elevated water temperature is controlled by returning the cooling water to a chiller, it is very difficult to make completely zero the fluctuation of the water temperature.

Furthermore, there is variation of water pressure when the water is circulated. Accordingly, by devising only a cooling method of the laser rod, required positional stability of the laser beam or output stability thereof can be satisfied with difficulty.

Furthermore, when the laser rod is cooled with the water, there is a problem that a vibration due to a water stream contains a component that matches with a resonant frequency of the laser rod, accordingly the rod begins to vibrate. Still furthermore, also when a heat sink that fixes the rod is air-cooled, the laser rod picks up the vibration due to a cooling fan and so on, as a result, it becomes a factor deteriorating the positional stability of the laser beam and the output stability thereof.

When the laser rod is made larger in its diameter and thereby a volume of the laser rod is increased, a resonant frequency of the laser rod may be lowered, and thereby a problem of the vibration may be overcome. However, when a single mode laser beam that is necessary for fine laser processing is oscillated, a diameter of the laser rod can be made larger only up to substantially 2 mm. Accordingly, the laser rod cannot be made larger up to a diameter that is less influenced by the external vibration due to such as the cooling water or the cooling fan.

Furthermore, it is also a big target to improve the laser oscillation efficiency. In order to facilitate a single mode laser beam to oscillate, it is necessary to concentrate excitation light in the neighborhood of a center of the laser rod. However, in that case, the conversion efficiency from the excitation light to oscillation light becomes such low as substantially 10 to 15%. Accordingly it is a task to facilitate the laser rod to efficiently absorb the excitation light and thereby to enhance the oscillation efficiency of the single mode laser beam.

Furthermore, when the single mode laser beam is oscillated, since heat addition is concentrated into a slender rod, the thermal lens effect results, as a result, an output laser beam cannot go straight. In order to overcome the problem, as the existing technology, it is considered to dispose a single crystal non-doped layer in the periphery of a single crystal laser rod. However, in the existing technology, it was very difficult to dispose the single crystal non-doped layer to a laser rod having a diameter of 2 mm or less that enables to obtain a single mode.

Accordingly, the invention intends to provide a composite laser rod in periphery of which, a non-doped pipe is bonded, as a structure that can overcome such problems and is less influenced by variation of cooling capacity of cooling water and a heat sink that cool the laser rod and the vibration from a cooling medium. That is, the invention intends to provide a composite laser rod that allows realizing a laser device excellent in the output stability and the beam positional stability, thereby allows Improving performance such as processing precision and processing speed of a laser processor, allows improving the oscillation efficiency, and furthermore allows oscillating laser beam excellent in beam quality; a fabricating method thereof; and a laser device therewith.

SUMMARY OF THE INVENTION

In the invention, a composite laser rod in which in order to realize a laser device excellent in the output stability and the positional stability of a beam so as to improve performance such as processing precision and processing speed, and to allow a laser rod to efficiently absorb excitation light and thereby to improve the oscillation efficiency, the refractive index of the laser rod is made higher than that of a non-doped pipe disposed in the periphery thereof, and, in order to suppress the thermal lens effect and thereby to allow oscillating laser beam high in the beam quality, a non-doped pipe that is higher in the thermal conductivity than that of the laser rod is connected to the periphery of the laser rod; a fabricating method thereof; and a laser device therewith are disclosed.

In the laser rod, a portion that absorbs the excitation light and generates heat is a portion where an active element is doped. Accordingly, when cooling water or a heat sink comes into direct contact with the portion, variation of the cooling capacity has direct influence on variation of the refractive index of the laser rod. Accordingly, when the periphery of a laser rod that is doped with a laser active element is enveloped with a non-doped pipe, an influence of the variation of the cooling capacity, without being directly communicated to the rod, is communicated through the non-doped pipe. Accordingly, since a slight variation of the cooling capacity is averaged over the non-doped pipe, the temperature variation of the rod where the active element is doped can be suppressed.

Furthermore, when a diameter of a laser rod in which the active element is doped is made smaller than 2 mm to obtain a single mode and a pipe of a non-doped layer is disposed in the periphery thereof, while maintaining the single mode of the laser oscillation, a diameter of the rod can be made larger. Since as the diameter of the rod is made larger, the characteristic frequency of the rod shifts to a lower frequency side, a component that resonates with a high frequency oscillation component from the cooling water and the cooling fan outside of the rod can be suppressed. As a result, the vibration of the laser rod can be suppressed, resulting in an appreciable improvement in the characteristics such as the positional stability and output stability of the laser beam.

As the methods for fabricating a structure in which a non-doped pipe is attached to the periphery of such laser rod, there are various kinds of proposals according to patent publications such as mentioned above. In all of the proposals, a single crystal laser rod and a single crystal non-doped layer are bonded. In the bond structure of the crystal and crystal, it is very difficult to completely integrate the laser rod and the non-doped layer in the periphery thereof.

In a composite laser rod according to the invention, a ceramic material that has a crystal structure the same as that of the laser rod is used as a pipe of a non-doped layer. As a result, the laser rod and the non-doped pipe can be completely integrated. For this, firstly, ceramic powder in which an active element is not doped is pre-baked to form a hollow ceramic pipe. Subsequently, a laser rod is inserted into the pipe followed by baking. As a result, during the baking, the pipe shrinks in its diameter, and thereby the laser rod and the pipe are integrated and bonded. Since the laser rod and the ceramic pipe have the same crystal structure, at an interface between these, slight element diffusion is caused, resulting in integrating these. By processing the integrated material into a predetermined shape followed by polishing, a composite laser rod can be fabricated.

When the composite laser rod that is fabricated by bonding the non-doped ceramic pipe to the periphery of the laser rod is used, an influence due to the vibration from the outside of the rod and heat generation of the rod can be suppressed.

Accordingly, the positional stability and the output stability of the laser beam oscillated from the laser rod can be improved.

For the laser rod, other than the single crystal rod that has been used, a ceramic laser rod can be used.

Furthermore, when a laser rod having garnet structure is used in the laser rod according to the invention, a trioxide, other than $Nd_2O_3$ or $Yb_2O_3$ of the laser active element, elements such $Lu_2O_3$ of rare-earth element, $Ga_2O_3$ or the like can be added. That is, as proposed in Optics Communications, vol. 115, 1995, pp. 491 or Journal of Crystal Growth, vol. 128, 1993, pp. 966, in both of the crystal and ceramic laser rods, the refractive index can be changed.

This means that when, in order to give difference of the refractive index at an interface with the non-doped pipe, the refractive index of the laser rod is made higher than that of the non-doped pipe in the periphery thereof, the excitation light inputted into the laser rod can be suppressed from leaking to the non-doped pipe. As a result, an effect confining the excitation light within the laser rod at a center can be enhanced, in comparison with the case where the refractive index difference is not given, an absorption efficiency of the excitation light in the laser rod can be increased, resulting in an improvement in the oscillation efficiency to oscillation light.

As a method of making larger the refractive index of the laser rod than that of the non-doped pipe, in the laser rod, gadolinium gallium garnet (GGG) that is a laser material higher in the refractive index than YAG may be used, and in the pipe, YAG may be used. Other than this, when the laser rod is made higher in the refractive index than the ceramic pipe by combining materials having cubic system crystal structure, the oscillation efficiency can be improved. When the laser rod has the refractive index higher by 0.3% or more than that of the ceramic pipe, light propagating inside of the laser rod begins to be reflected at the interface with the ceramic pipe, and when the refractive index difference becomes larger than that, a light confinement effect becomes further larger.

Furthermore, in a laser oscillator, a portion that holds the laser rod, because of incapable of absorbing the excitation light from a side surface, does not contribute to the oscillation. The active element in the laser rod in the portion that cannot be excited, because of absorbing the oscillation light, causes a decrease in the oscillation efficiency. As means for solving the problem, in, for instance, IEEE Journal of Quantum Electronics, vol. 33, 1997, pp. 1592, a method in which to both end portions of the laser rod that are not excited a non-doped single crystal having the same structure as that of the laser rod is bonded is disclosed. When, by applying the structure to the composite laser rod according to the invention, non-doped ceramic rods are bonded to both ends of the laser rod, together with an improvement in the positional stability and suppression of the output fluctuation, an improvement in the oscillation efficiency can be attained.

Furthermore, when the thermal conductivity of the ceramic pipe that is bonded to the periphery of the laser rod is made higher than that of the laser rod, the laser rod can be efficiently cooled. The thermal conductivity of $Y_2O_3$ or $Sc_2O_3$ is substantially twice that of garnet system materials. Accordingly, when an $Y_2O_3$ system ceramic pipe is bonded to the periphery of the garnet system laser rod, the thermal lens effect of the laser rod can be suppressed.

As mentioned above, when a non-doped ceramic pipe is bonded to the periphery of a laser rod, improvements in the positional stability, output stability, and oscillation efficiency, and suppression of the thermal lens effect can be attained.

In the following, operations thereof will be explained.

A single crystal described in the invention is a material that is grown from a molten melt according to a crystal growth method such as a pulling method and so on and has no grain boundary. Furthermore, ceramic is a material that is an agglomeration of single crystal fine particles of millimeter or less in dimension, has grain boundaries, and can be obtained, without completely melting powder particles to be a raw material, by sintering and thereby grain growing.

The ceramic pipe used in the invention can effectively operate when the crystal system of particles that constitute the ceramic is cubic system (or isometric system). This is because a lattice constant of a crystal of the cubic system is three-dimensionally isotropic, thermal expansion coefficient is also three-dimensionally isotropic. From this reason, whatever direction grains of the particles that constitute the ceramic material are bonded each other, after sintering and integration, there is no residual strain. Since the physical properties of the sintered ceramic are substantially the same as that of a single crystal, when the single crystal and ceramic are integrated, no strain is generated at the interface.

As crystals applicable as the laser crystals, other than ones having the garnet structure, materials belonging to the cubic system among oxides of trivalent metals such as Re (rhenium) and so on, for instance, $Re_2O_3$, $Y_2O_3$, $Sc_2O_3$ and so on can be cited, the invention can be applied thereto. Furthermore, even when the laser rod and the ceramic pipe have different compositions or crystal structures, when the laser rod and the ceramic pipe are made of materials of the cubic system and have no anisotropy in the thermal expansion and the difference of the thermal expansion coefficients thereof is within 10%, these can be bonded.

When the ceramic powder is sintered and facilitated to exhibit the physical properties the same as that of a crystal, voids have to be removed. In order to obtain the ceramic material having such crystal physical properties, it is very important to prepare a starting raw material that is excellent in the compositional uniformity and particle shape uniformity. It is desired that diameters of particles of starting raw material are several μm or less, and the smaller the particle diameter, the better. When there is the difference in the particle diameters, the difference of the sintering behavior due to the difference of the particle diameters is caused, nonuniformity in the dimensions of grains results after the baking, and in some places mechanical properties vary. When the dispersion of particle sizes is suppressed to ±1 μm or less, the above problem can be overcome.

As a method of obtaining a starting raw material having uniform particle diameters, there are two approaches. In one of the two, raw materials, after weighing so as to have a composition the same as that of a crystal, are mixed and pre-baked followed by pulverizing again down to nano order by means of a ball mill. By repeating the process several times, ultra-fine particles having the composition the same as that of the crystal are obtained. In the other approach, by use of a chemical reaction in a solution, a salt having a composition the same as that of the crystal is co-precipitated. After weighed raw material powder is dissolved in a solution, by adjusting to a predetermined pH, a plus electric charge and a negative electric charge react one to one, and thereby a ceramic raw material that is excellent in the compositional uniformity can be obtained. By processing the precipitation, a raw material of ceramic can be obtained.

In raw material of the ceramic pipe, the ceramic material obtained as mentioned above is agitated together with an organic binding material called a binder and a solvent such as water or alcohol, or toluene or xylene, and thereby a low viscosity state called slurry is obtained and used. After water is removed from the slurry followed by pre-baking, a pipe structure can be obtained. In this state, individual particles constituting the ceramic are not completely bonded. However, by carrying out actual baking, individual particles constituting the ceramic are sintered each other, spaces at interfaces of particles are narrowed and finally disappear. When the particle sizes are uniform, without grain-growing irregularly, an entirety of particles grows uniformly.

The pre-baked ceramic pipe, until coming into contact with a rod inserted inside thereof, continues deforming in a direction in which an inner diameter contracts. However, when the contraction proceeds to a certain extent and the ceramic pipe comes into contact with the laser rod inserted therein, a contracting force of the pipe does not work in a direction in which the force compresses the laser rod, but disperses in a radial direction of the pipe. This is called a plastic deformation effect that is exhibited when the ceramic particles are sintered. The composite laser rod according to the invention utilizes a large plastic deformation that is a characteristic phenomenon exhibited when the ceramic particles are sintered. Accordingly, without causing compression strain on the laser rod inserted in a center of the ceramic pipe, the laser rod can be completely integrated with the surrounding ceramic pipe. Plasticity is an effect by which even in the case of a hard material, at the bonding between atoms or particles constituting the material, defects are caused and displacement is caused, and thereby the material is deformed. When the ceramic is sintered, a bonding-state between the particles changes, and thereby the plastic deformation is caused.

The laser rod at the center, being chemically stable at temperatures where the ceramic is sintered, does not change in its shape. However, at a portion where the laser rod is bonded with the ceramic pipe, atomic diffusion is slightly caused, resulting in bonding. Accordingly, after the integration, the laser rod does not come off the ceramic pipe.

Although a distance of the atomic diffusion at a bonding interface is determined according to a temperature at and period of time for which the laser rod and the ceramic pipe are sintered, an effect of the temperature is larger. When the sintering temperature is higher, the laser active element doped in the laser rod diffuses into the ceramic pipe, resulting in deteriorating the laser oscillation mode. In the invention, however, a temperature at which the composite laser rod is formed is set at 90% or less the melting point of the laser rod in a center thereof. At the temperature, the laser active element in the laser rod hardly diffuses to a ceramic pipe side and the laser oscillation mode is not deteriorated.

The laser oscillation mode is determined by a diameter of the laser rod or the thermal lens effect caused by heat generated in the laser rod, and furthermore by an excitation method or the respective curvatures of an output mirror and a rear mirror that constitute a resonator. The laser oscillation mode from the laser rod that is excited from a side surface mainly depends on a diameter of the laser rod in which the laser active element is contained. When the single mode laser is desired to be excited by use of the side surface excitation, the diameter of the laser rod is necessary to be 2 mm or less. When the rod diameter is 2 mm or less, since the crystal can be solidly fixed with difficulty, problems such as thermal fluctuation or the vibration are caused, resulting in causing problems in the output stability and the positional stability of the beam. However, when the ceramic pipe is bonded to the laser rod of 2 mm, a composite laser rod having the oscillation beam of the single mode and a diameter of 2 mm or more can be realized. Accordingly, owing to the invention, the problems concerning the output stability and the positional stability can be overcome.

DESCRIPTION OF THE PREFERRED EMBODIMENTS

In order to further detail the invention, the invention will be explained with reference to the attached drawings.

[Embodiment 1]

FIGS. 1A to 1C and 2A to 2C are diagrams showing, with perspective views, one implementation mode in a manufacturing process of a composite laser rod according to the invention.

Figure 1A:
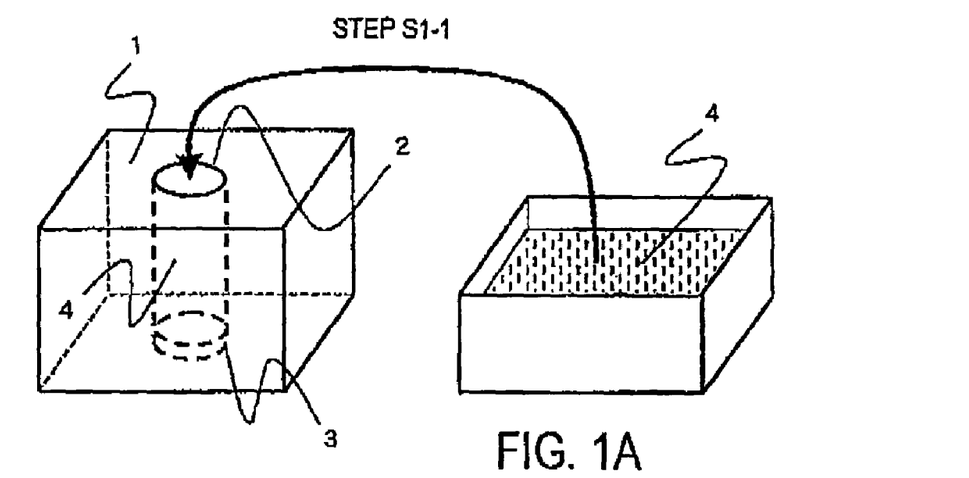
FIGS. 1A to 1C are diagrams showing one implementation mode for explaining a first half of a manufacturing process according to the invention.
Figure 1B:
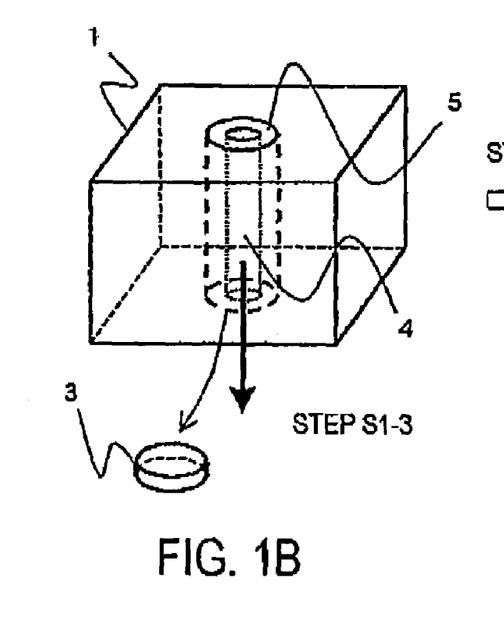
Figure 1C:
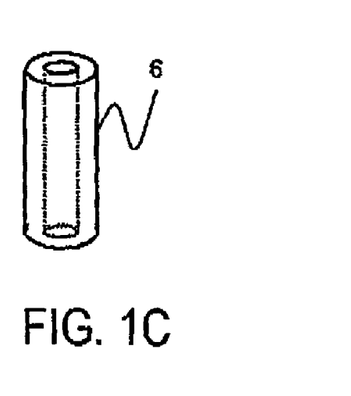

According to the fabricating method of a composite laser rod shown in FIGS. 1A to 1C, firstly, particles containing a composition to be $Y_3Al_5O_{12}$ that is a YAG composition are prepared according to a co-precipitation method, the precipitated particles are recovered and baked, and thereby fine particles having a YAG composition and a particle diameter of 100 nm are obtained. The powder is mixed together with an organic binder and a solvent (alcohols, toluene, xylene and so on) in a ball mill to prepare slurry 4 of the YAG fine powder. Thus prepared slurry 4 is filled (STEP S1-1) in a hole 2 of gypsum 1 as shown in FIG. 1A and held for 1 hour therein, and thereby water in the slurry 4 is partially absorbed (step S1-2) by the gypsum 1. Thereafter, a bottom lid 3 of the hole 2 of the gypsum 1 is removed, and the slurry 4 remaining in a center portion as shown in the drawing and rich in the water is exhausted from the hole 2. An amount of the slurry 4 being exhausted is determined according to a degree to which the water is absorbed by the gypsum 1. When a period of time during which the slurry 4 is held in the hole 2 is accurately controlled, an exhaustion amount of the slurry 4 can be controlled.

That is, the exhaustion amount determines a diameter of a center portion of a flesh portion 5 formed out of the slurry 4 remained in the hole 2. Accordingly, by controlling a hold time of the slurry 4 in the gypsum 1, a dimension of the hole 2 of the flesh portion 5 can be accurately controlled. A time during which the slurry 4 flows out after the bottom lid 3 is opened is 0.1 s or less, and an inner wall surface of a pipe-like flesh portion 5 remained in the hole 2 is obtained as a smooth surface. The flesh portion 5 remained on an inner surface of the hole 2 of the gypsum 1, after water is completely removed by dehydration (step S1-3), is taken out of the gypsum 1.

Subsequently, the pipe-like flesh portion 5 is pre-baked (step S1-4) at 800 degree centigrade for 10 hour to degrease, and thereby a pre-baked ceramic YAG pipe 6 having an inner diameter of 2.1 mm, an outer diameter of 4 mm and a length of 50 mm is generated.

Figure 2A:
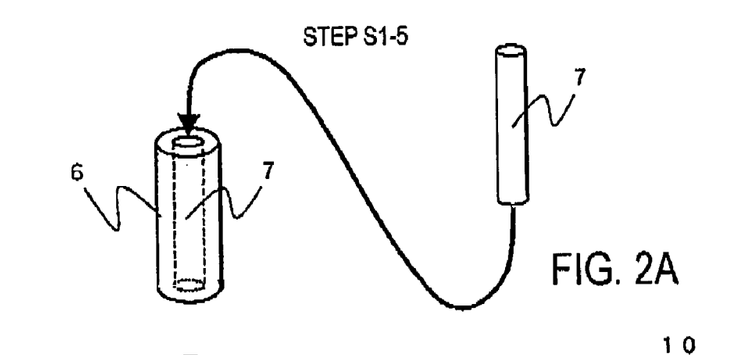
FIGS. 2A to 2C are diagrams showing one implementation mode for explaining a second half of a manufacturing process according to the invention.
Figure 2B:
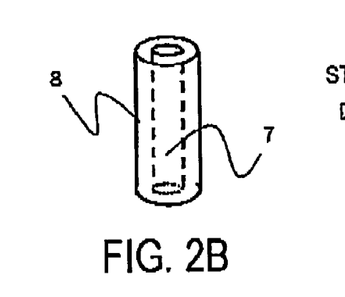
Figure 2C:
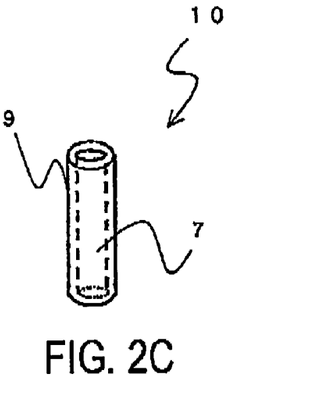

In the next place, as shown in FIGS. 2A to 2C, a single crystal YAG laser rod 7 that has a diameter of 2 mm and a length of 35 mm and in which an active element, Nd, is added at a concentration of 1 atomic % is inserted in the pre-baked pipe 6 (step S1-5). A side surface of the laser rod 7 is mirror polished before the insertion. When the pre-baked pipe 6 into which the laser rod 7 is inserted is baked at 1700 degree centigrade for 10 hour (step S1-6), the pre-baked pipe contracts owing to the baking, and thereby a baked ceramic pipe 8 results. As a result, owing to the action of the plastic deformation effect, the laser rod 7 and the ceramic pipe 8 can be integrated at a bonding interface. The bonded interface, as a result of detailed investigation, is confirmed that only in a region of several tens angstroms that correspond to several atomic layers, the laser rod 7 and the ceramic pipe 8 are bonded owing to the diffusion, and that the diffusion of Nd atoms Into the ceramic pipe 8 portion can be almost neglected.

A dimension of the material in which the rod and pipe after the baking are integrated is 3.9 mm and 50 mm in an outer diameter and a length, respectively. The material is processed into a diameter of 3 mm and a length of 30 mm so that a thickness of the ceramic pipe may be formed 0.5 mm as a covering layer in the periphery of the rod followed by polishing a side surface and end surfaces (step S1-7), and thereby a composite laser rod 10 in which the laser rod 7 and a ceramic skin layer 9 are integrated as shown in the drawing can be formed.

Figure 3:
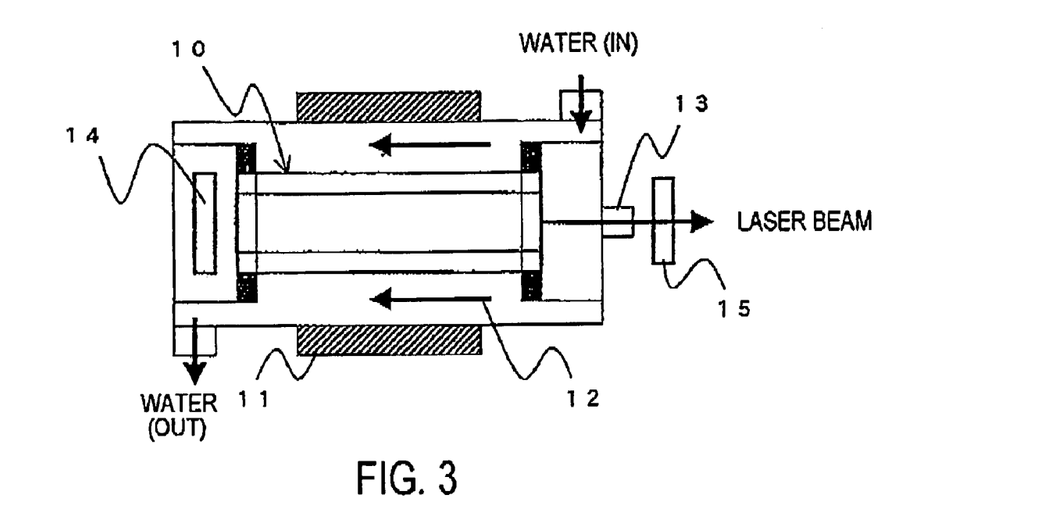
FIG. 3 is a diagram showing one mode of a configuration in a laser oscillator in which a composite laser rod is used.

In the next place, an embodiment of a laser oscillator that is shown in FIG. 3 and in which the composite laser rod 10 is used will be explained.

In a laser oscillator shown in the drawing, cooling water 12 is flowed along a side surface of the composite laser rod 10 that is held at both ends, and from the outside thereof a side surface excitation is applied with an exciting LD (laser diode) 11. A pulse oscillation is effected with a Q-switch 13 and a pulse of pulse laser beam is outputted from an output mirror 15.

A measurement monitored with an oscilloscope of an waveform of each pulse of the outputted pulse laser beam is compared with characteristics when an ordinary single crystal YAG laser rod that is not provided with a non-doped pipe and has a diameter of 2.0 mm, a length of 30 mm and an added Nd concentration of 1 atomic % is used.

Figure 4:
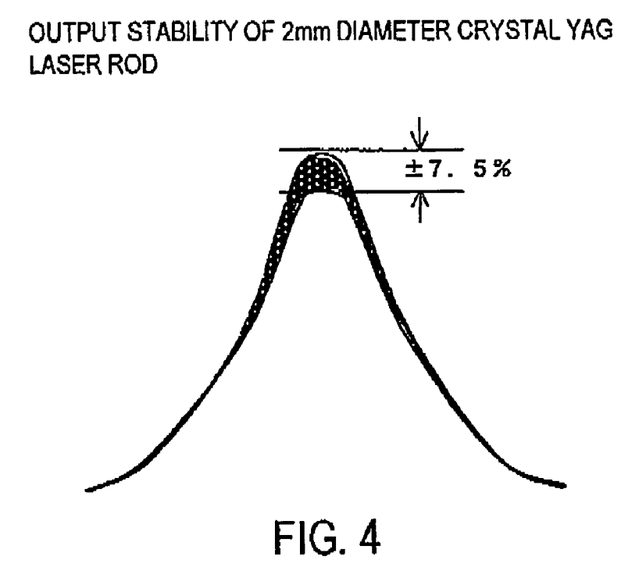
FIG. 4 is a diagram showing one example of the stability of a pulse-to-pulse output of a 2 mm-diameter crystal YAG rod.
Figure 5:
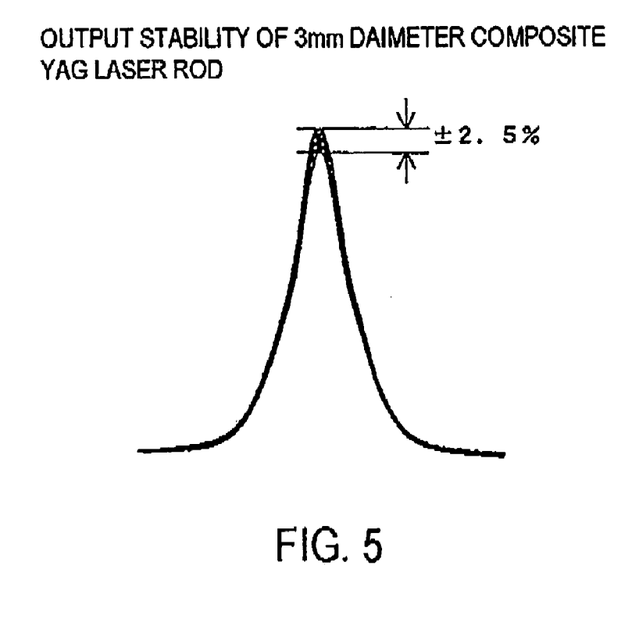
FIG. 5 is a diagram showing one example of the stability of the pulse-to-pulse output of a 3 mm-diameter crystal YAG rod.

FIGS. 4 and 5 are diagrams showing the pulse-to-pulse stability of the laser beam having a wavelength of 1.064 nm oscillated at 10 kHz.

As shown in FIG. 4, in the case of an ordinary single crystal YAG laser rod, the output stability is ±7.5%, in contrast, as shown in FIG. 5, in the case of the composite YAG laser rod 10, the output stability thereof is ±2.5%. That is, the output dispersion becomes one third that of the ordinary rod, resulting in an improvement by three times in the output stability. The output modes are the single mode for both cases.

Figure 6:
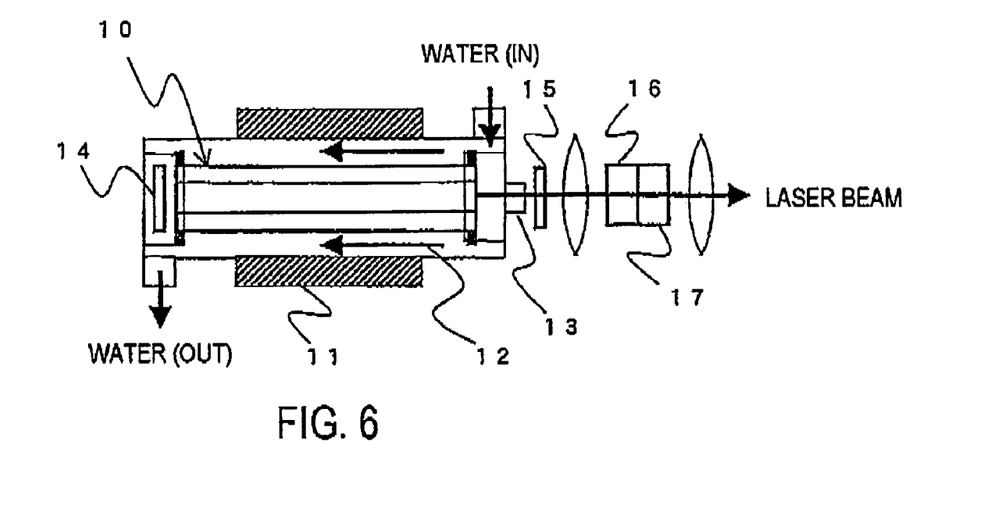
FIG. 6 is a diagram showing one mode of a configuration in which a wavelength conversion function of excitation light is added in the laser oscillator in FIG. 3 to obtain a third harmonic.

Furthermore, another actual measurement with the composite laser rod 10 will be explained with reference to FIG. 6. In FIG. 6, to the laser oscillator shown in FIG. 3, a lens, a second harmonic generation element 16 and a third harmonic generation element 17 are added to an outputted laser beam.

In the illustrated laser oscillator, a laser beam is focused with a lens and inputted into the second harmonic generation element 16 and the third harmonic generation element 17, and 355 nm that is of the generated third harmonic is oscillated. The positional stability of the beam according to the apparatus is studied by use of a beam profiler. In order to study the magnitude of the fluctuation while enlarging, a laser beam is allowed to propagate 2 meter from a third harmonic output surface into a space, and the beam is received by the beam profiler and studied.

Figure 7:
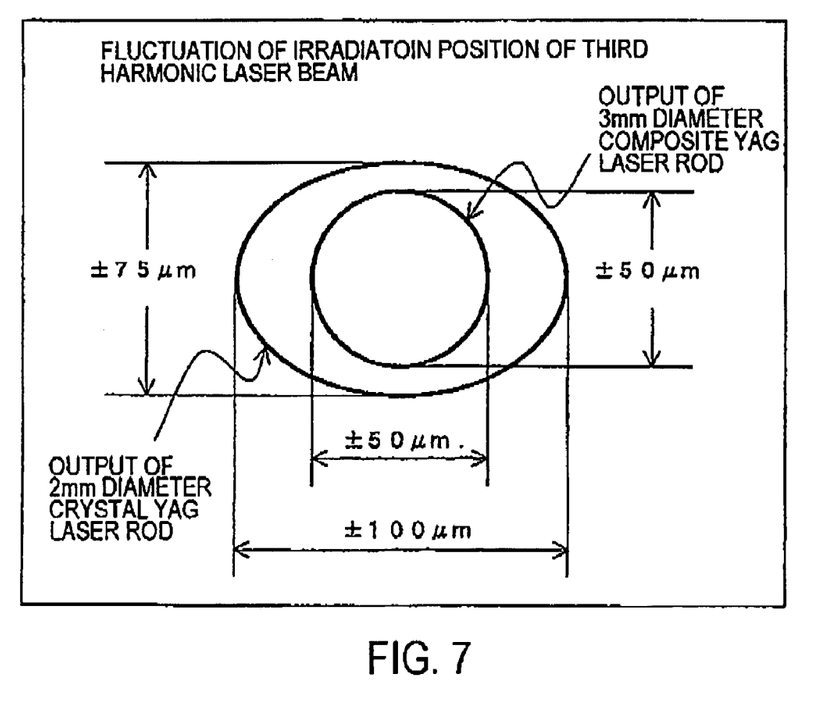
FIG. 7 is a diagram showing one example of fluctuation of an irradiation position of a third harmonic laser beam in each of a composite YAG rod and a crystal YAG rod.

As a result, as shown in FIG. 7, while the fluctuation of the output beam of the ordinary 2 mm-diameter single crystal YAG laser rod is ±100 μm in the X-axis direction and ±75 μm in the Y-axis direction, that of the 3 mm-diameter composite YAG laser rod 10 is ±50 μm in the X-axis direction and ±50 μm in the Y-axis direction. That is, it is confirmed that the beam positional stability of the wavelength-converted light is improved by 50% in the X-axis direction and 66% in the Y-axis direction. From the results, it can be confirmed that not only the output positional stability of the beam is improved, but also the difference in X- and Y-axis directions of the positional stability is made smaller, and thereby the fluctuations are equalized. By the way, when the laser processing is performed with the laser beam, it is confirmed that the processing precision is improved with a ratio same as that of the improvement of the positional stability and an aspect ratio of a shape of a hole formed by the processing is improved from 4:3 to substantially 1:1.

[Embodiment 2]

Next, with reference to FIG. 8, another composite laser rod 20 different from that described above will be explained.

The illustrated composite laser rod 20 is fabricated as follows. Firstly, in order to obtain a high quality single mode narrow laser beam, a single crystal YAG laser rod 21 that contains 0.7 atomic % of Nd and has a diameter of 1 mm and a length of 15 mm is prepared. In the next place, the YAG laser rod 21 is bonded to a ceramic YAG pipe 22 according to a method same as that of the above embodiment, and thereby the composite laser rod 20 having a diameter of 3 mm and a length of 15 mm is prepared. The composite laser rod 20, as shown in the drawing, is disposed between an output mirror 25 and a rear mirror 24. The composite laser rod 20, similarly as shown in FIG. 3, is excited from a side surface with a laser diode, and thereby, without disposing an aperture, an oscillation beam of a single mode having a beam diameter of 1 mm can be outputted. In the laser oscillator, the pulse-to-pulse output stability is ±2.5%, the positional stability of the laser beam is ±10 μm in both length and breadth directions at a position after the laser beam is propagated 1 meter in a space, and an aspect ratio of the positional stability is 1:1.

Figure 8:
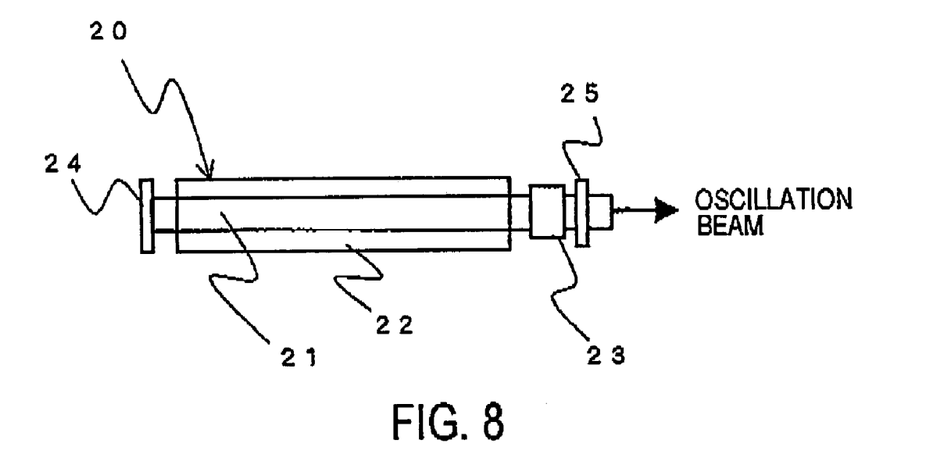
FIG. 8 is a diagram showing one example of a laser oscillator configuration in which a diameter of an oscillation laser beam is provided by a laser rod diameter in the composite laser rod.

For comparison purpose, a single crystal YAG laser rod that has a diameter of 1 mm and a length of 15 mm and contains 0.7 atomic % of Nd is prepared, and an oscillation experiment is carried out according to a resonator configuration same as FIG. 8. As a result, because of narrowness of the laser rod, the laser rod is fixed in the resonator with difficulty, and the laser rod is caused to vibrate owing to the vibration of the cooling water that flows in the periphery of the rod, though oscillated in the single mode, the pulse-to-pulse output stability resulting in ±10%.

Figure 9:
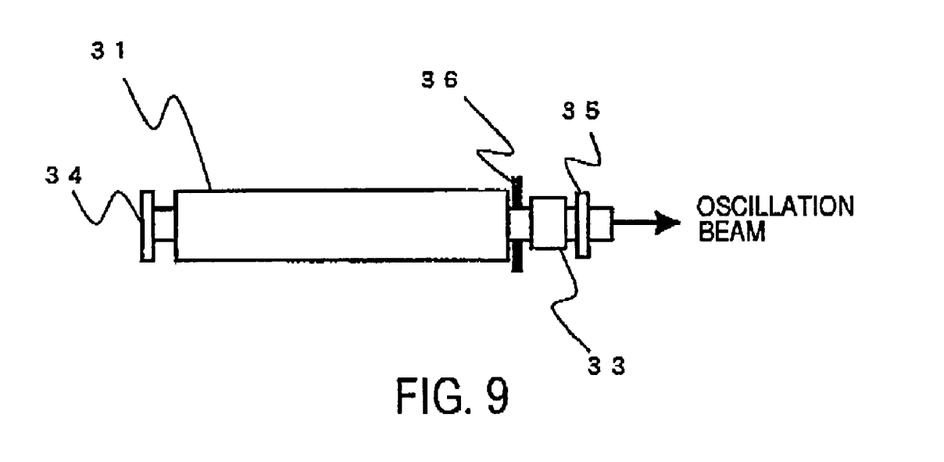
FIG. 9 is a diagram showing one example of a laser oscillator configuration in which a diameter of an oscillation laser beam is provided by an aperture in a resonator.

Then, as shown in FIG. 9, a single crystal YAG laser rod 31 that has a diameter of 3 mm and a length of 15 mm is prepared, an aperture 36 having a diameter of 1 mm is disposed before an output mirror 35, and similarly to the above method, the laser rod 31 is oscillated. As a result, an oscillation beam of a single mode having a beam diameter of 1 mm can be outputted. However, the pulse-to-pulse output stability is ±7%, and the oscillation efficiency from the excitation light to the oscillation light, in comparison with the embodiment of FIG. 8, decreases to two third. This is because there is a Nd doped portion that does not contributes to the oscillation in the rod, this absorbs the excitation light.

[Embodiment 3]

Figure 10A:
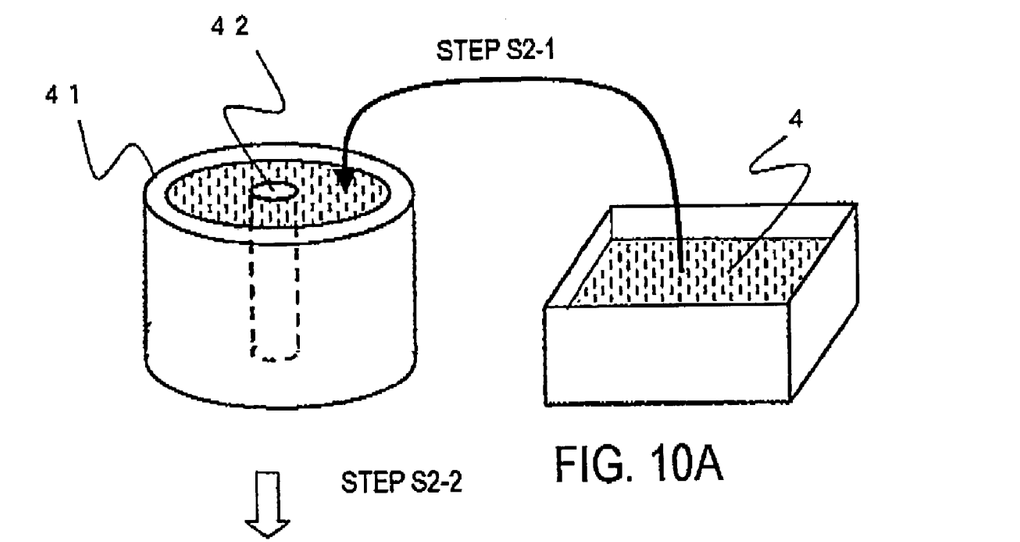
FIGS. 10A to 10C are diagrams showing one implementation mode for explaining a manufacturing process according to another invention different from one in FIGS. 1A to 1C and FIGS. 2A to 2C.
Figure 10B:
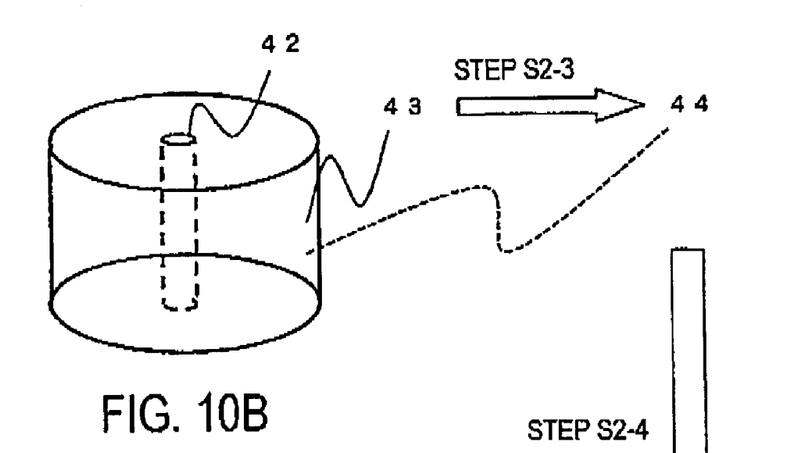
Figure 10C:
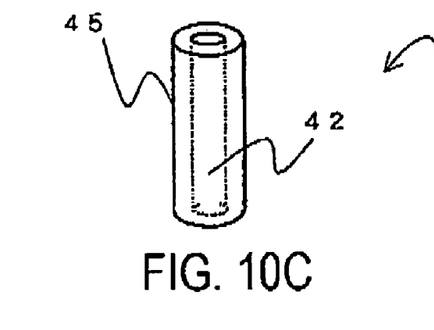

In the next place, a fabricating method of a still another composite laser rod 40 different from the above will be explained with reference to FIGS. 10A to 10C.

Firstly, a ceramic YAG laser rod 42 that has a diameter of 2 mm and a length of 30 mm and contains an active element, Nd, of 1.5 atomic % is prepared. The ceramic laser rod 42, as shown in the drawing, is disposed at a center portion of a cylindrical slurry container 41. In this state, slurry 4 for use in the formation of YAG ceramic that is prepared according to a process the same as mentioned above is discharged and filled in the container (step S2-1). Thereafter, water in the slurry 4 is vaporized followed by pre-baking at 800 degree centigrade for 10 hour, and thereby pre-baked ceramic material 43 is formed. Subsequently, the slurry container 41 is removed (step S2-2). Furthermore, the pre-baked ceramic material 43, with the laser rod 42 inserted, is baked at 1700 degree centigrade for 10 hour (step S2-3), and thereby the periphery of the Nd-doped ceramic YAG laser rod 42 Is surrounded by a transparent ceramic YAG material 44. The ceramic YAG material 44 is polished (step S2-4) so as to form a ceramic pipe 45 having a thickness of 0.5 mm as a skin layer, and thereby the composite laser rod 40 having an outer diameter of 3 mm and a length of 30 mm is formed.

When an oscillation experiment of laser beam is performed with the composite laser rod 40, the laser beam output stability of ±2.5% and the beam positional stability of the third harmonic of ±0.75 μm are obtained, respectively. That is, the same results as that of the composite laser rod in which the single crystal YAG laser rod 7 is used are obtained. Furthermore, since the Nd concentration is 1.5 atomic % higher by 0.5% than 1.0% of the single crystal YAG laser rod 7, it is confirmed that at the same laser diode excitation power, the oscillation output is improved by substantially 20%.

[Embodiment 4]

Figures 11A, 11B:
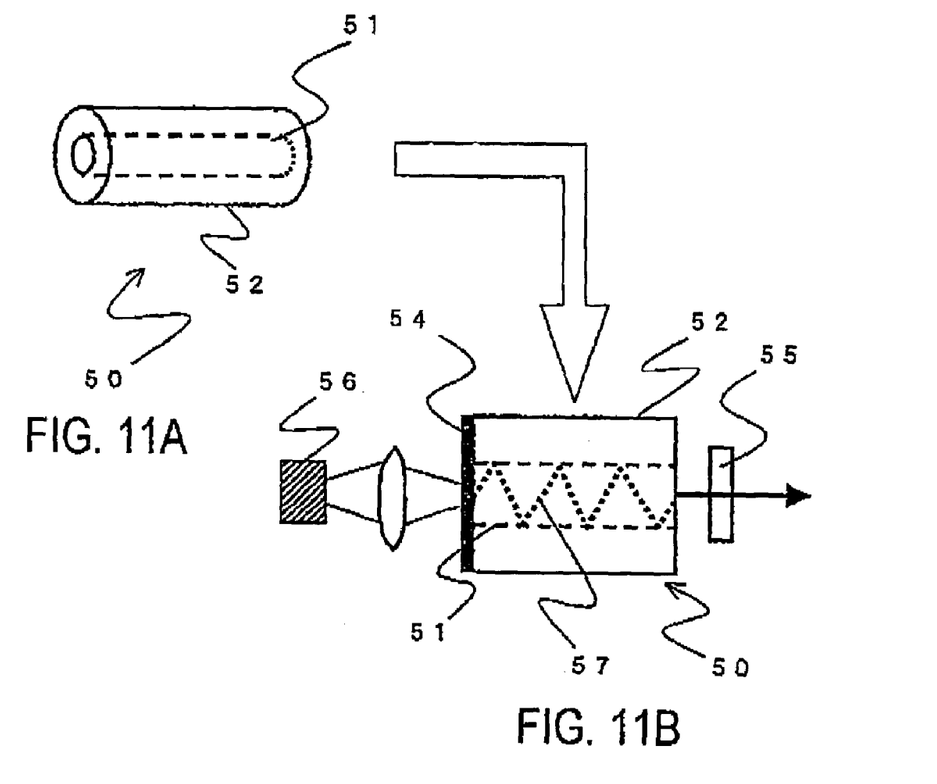
FIGS. 11A and 11B are diagrams showing one example of each of a composite laser rod configuration different from ones explained with reference up to FIGS. 10A to 10C and a configuration of a laser oscillator therewith.

Next, still another composite laser rod 50 different from the above ones and a laser oscillator therewith will be explained with reference to FIGS. 11A and 11B.

An experiment is carried out to fabricate a composite laser rod in which the refractive index of a laser rod is higher than that of a ceramic pipe. A ceramic YAG rod that contains 1 atomic % of Nd, 10 atomic % of Lu, and 20 atomic % of Ga, has a length of 5 mm and a diameter of 2 mm, and has a mirror-polished side surface is prepared. The ceramic YAG rod is inserted in a pre-baked ceramic YAG pipe that is fabricated according to a procedure the same as that described above and has a length of 10 mm, an inner diameter of 2.1 mm and an outer diameter of 5.1 mm followed by baking at 1700 degree centigrade for 10 hour. After the baking, the periphery thereof is processed, and thereby a composite laser rod 50 is formed such that the periphery of the Nd, Lu, Ga doped ceramic YAG laser rod 51 having a diameter of 5.0 mm and a length of 5 mm is bonded to the non-doped ceramic YAG pipe 52.

In the composite laser rod 50, the ceramic YAG laser rod 51 at a center thereof has the refractive index of 1.84 that is higher by 1.1%, 0.02 in the refractive index, than 1.82 of the ceramic YAG pipe 52 in the periphery thereof. Accordingly, as shown in the drawing, excitation light 57 in the composite laser rod 50 that is excited through a side surface with an exciting LD 56 is confined into the Nd, Lu, Ga-doped ceramic YAG laser rod 51. As a result, the excitation light 57 is efficiently absorbed by the ceramic YAG laser rod 51.

The oscillation efficiency is compared with that of the composite laser rod in which a single crystal YAG laser rod doped with 1 atomic % of Nd is used as the laser rod. As a result, it is confirmed that under the same excitation light intensity condition, the excitation efficiency when the Nd, Lu, Ga-doped ceramic YAG laser rod 51 is used is 1.2 times that of the 1 atomic % Nd-doped single crystal YAG laser rod.

Similarly, when a ceramic YAG rod that contains 1 atomic % of Nd and 70 atomic % of Lu and has the same dimension is used as the laser rod, the refractive index of the rod becomes 1.83, that is, higher by 0.5% in the refractive index than that of the ceramic YAG pipe. When the same experiment is carried out with the laser rod, the laser beam intensity is 1.1 times that of the 1 atomic % Nd-doped single crystal YAG laser rod. Furthermore, the refractive index of a ceramic laser rod in which 1 atomic % of Nd and 18 atomic % of Ga are doped is also 1.83, and when the characteristics of the laser rod to which a ceramic YAG pipe is bonded are compared by the same experiment, it is confirmed that the laser beam intensity becomes 1.1 times higher than that of the 1 atomic % Nd-doped single crystal YAG laser rod.

[Embodiment 5]

Figure 12:
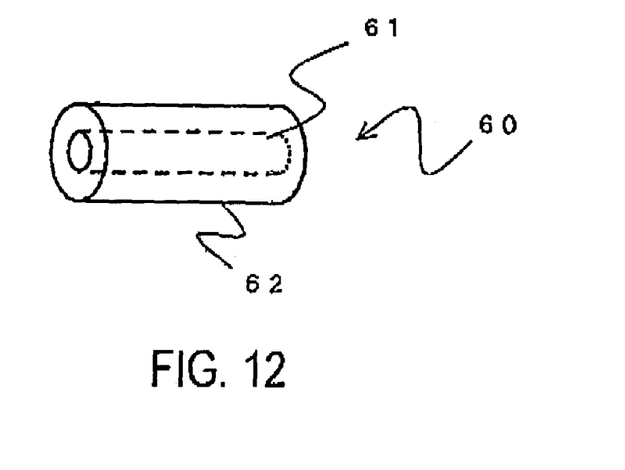
FIG. 12 is a diagram showing one example of a composite laser rod configuration different from ones explained with reference up to FIGS. 11A and 11B.

In the next place, with reference to FIG. 12, a composite laser rod 60 different from ones described above will be explained.

Firstly, a single crystal gadolinium gallium garnet ($Gd_3Ga_5O_{12}$, GGG) laser rod 61 that is doped with 1 atomic % of Nd and has a diameter of 2 mm and a length of 35 mm is prepared and a side surface thereof is mirror-polished. With the laser rod 61, in the periphery thereof, according to a process the same as that described above, a non-doped ceramic YAG pipe 62 is formed. As a result, the composite laser rod 60 having a diameter of 3 mm and a length of 35 mm is formed. Since the refractive index of GGG is 1.94 and that of YAG is 1.82, there is 6% of the refractive index difference therebetween. Accordingly, light excited from a side surface of the composite laser rod 60 can be confined into the GGG laser rod 61 at the center thereof.

The laser rod is oscillated by means of the side surface excitation and the results thereof are compared with that of a composite laser rod in which the GGG ceramic is used in the ceramic pipe so that there is no refractive index difference. As a result, under the same excitation light intensity condition, the oscillation efficiency can be improved by 10%. From the result, it is confirmed that when the refractive index of the laser rod that constitutes the composite laser rod is made higher than that of the ceramic pipe in the periphery thereof, the beam positional stability and output stability can be improved in comparison with an ordinary rod, and the oscillation efficiency is improved in comparison with that of the composite laser rod in which the refractive index difference is not disposed.

[Embodiment 6]

Next, a composite laser rod 70 different from ones described above will be explained with reference to FIGS. 13A and 13B.

Figure 13A:
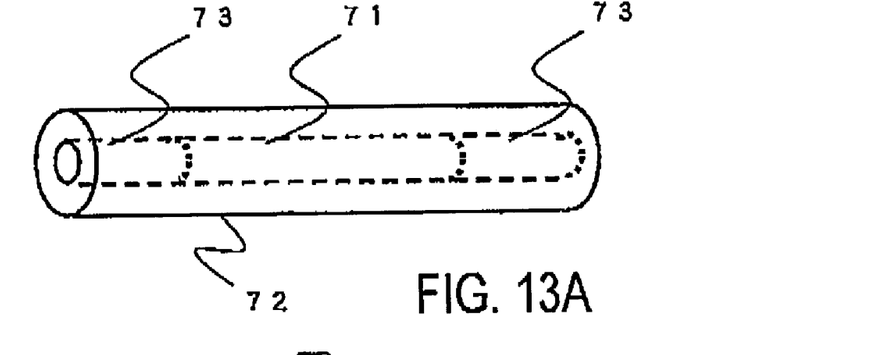
FIGS. 13A and 13B are diagrams showing one example of a composite laser rod configuration different from ones explained with reference up to FIG. 12 and portions different in the manufacturing process therefrom.
Figure 13B:
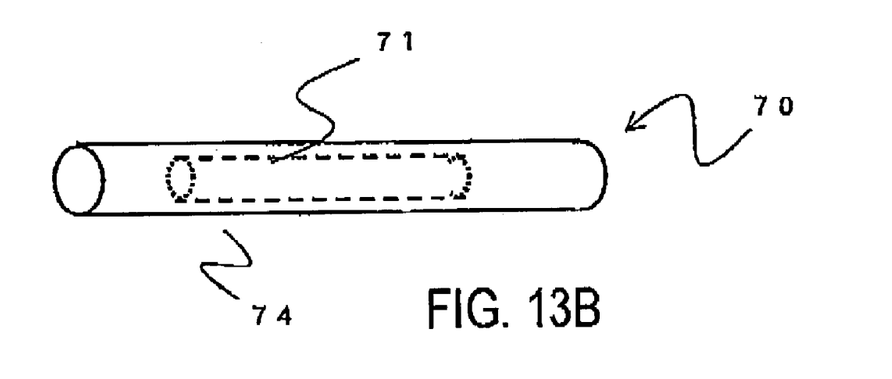

First, in place of the above Nd-doped single crystal YAG laser rod, a ceramic $Y_2O_3$ laser rod 71 that contains 5 atomic % of Yb and has a diameter of 2 mm and a length of 35 mm is prepared. A non-doped ceramic pipe in the periphery thereof is fabricated with slurry in which $Y_2O_3$ powder is used. As illustrated in the drawing, after the Yb-doped ceramic $Y_2O_3$ laser rod 71 is inserted into a pre-baked ceramic $Y_2O_3$ pipe 72, non-doped ceramic $Y_2O_3$ rods 73 that are separately prepared and have a diameter of 2 mm and a length of 5 mm are inserted into a hollow portion of the ceramic $Y_2O_3$ pipe 72 from both sides thereof. In order to promote the bonding between the ceramic $Y_2O_3$ laser rod 71 and the non-doped ceramic $Y_2O_3$ rods 73, in a gap in the ceramic $Y_2O_3$ pipe 72, slurry of $Y_2O_3$ is filled in. Thereafter, by baking at 1700 degree centigrade for 10 hour, the rods 71 and 73 in the ceramic $Y_2O_3$ pipe 72 and the pipe 72 are integrated, and thereby a ceramic covered body 74 in which the non-doped ceramic completely covers the doped-ceramic $Y_2O_3$ laser rod 71 is formed. From the sample after the baking, the composite laser rod 70 having a length of 45 mm and a diameter of 3 mm is fabricated.

The composite laser rod 70 forms a rod in which, at both ends thereof, the pipe 72 and the rods 73 all of which are made of non-doped ceramic $Y_2O_3$ are completely integrated. When the oscillation characteristics of the composite laser rod are measured with a resonator in which laser diode excitation is applied from a side surface, it is found that output is improved by substantially 15% in comparison with that of a composite laser rod in which the non-doped portions are not disposed at both ends.

[Embodiment 7]

Figure 14:
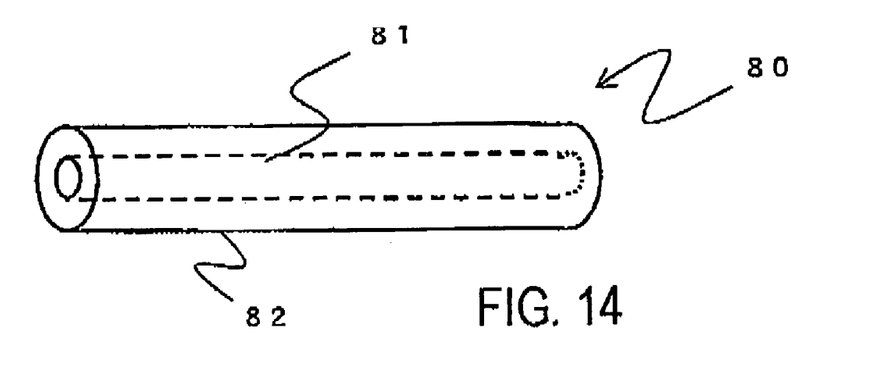
FIG. 14 is a diagram showing one example of a composite laser rod configuration different from ones explained with reference up to FIGS. 13A and 13B.

In the next place, with reference to FIG. 14, a composite laser rod 80 different from ones described above will be explained.

As a laser rod, a single crystal YAG laser rod 81 that has a diameter of 2 mm and a length of 30 mm and contains 0.8 atomic % of Nd is prepared. As a non-doped ceramic pipe in the periphery thereof, one that is prepared with slurry of $Y_2O_3$ is prepared. In a pre-baked $Y_2O_3$ ceramic pipe, the single crystal YAG laser rod 81 is inserted followed by baking at 1700 degree centigrade for 10 hour and furthermore followed by processing, and thereby the composite laser rod 80 that has a diameter of 3 mm and a length of 30 mm and in which to the periphery of the single crystal YAG laser rod 81 the ceramic $Y_2O_3$ pipe 82 is bonded is prepared. The rod is oscillated with the resonator similar to one described in FIG. 3, and the thermal lens effect is compared with that of one in which a ceramic YAG pipe is bonded to a periphery. Since the thermal conductivity of the $Y_2O_3$ pipe is such large as twice that of the YAG pipe, the laser rod can be more excellently cooled, resulting in a reduction of the thermal lens effect by 30% or more.

As explained above, according to the invention, a composite laser rod in which a laser rod and a non-doped ceramic pipe that becomes a skin layer in a periphery of the rod are baked and completely integrated is realized. The composite laser rod according to the invention can suppress the thermal fluctuation of the laser rod during the laser oscillation associated with the variation of the cooling capacity, and can reduce an influence of the vibration received from the cooling medium. Accordingly, the positional stability and the output stability of the laser beam oscillated from the laser rod can be improved. Furthermore, when a composite laser rod with a combination in which the refractive index of the laser rod is higher than that of the ceramic pipe is prepared, since the excitation light can be efficiently absorbed by the laser rod, the oscillation efficiency can be improved. Still furthermore, when the ceramic pipe is formed with a material higher in the thermal conductivity than that of the laser rod, since the rod can be efficiently cooled, the thermal lens effect can be lowered. When the laser rod according to the invention is applied to a laser processor, high precision and stable laser processing can be speedily and efficiently performed.

Accordingly, for instance, processing accuracy in boring a hole in a printed wiring board is improved, and energy for a pulse of a laser beam is also increased. As a result, the number of pulses is less needed for the same processing and the processing speed is also enhanced. Furthermore, in a trimming device that uses a laser beam, while measuring characteristics of an element to be trimmed, laser beam is irradiated onto the element. When the composite laser rod according to the invention is used, finer control of the element characteristics can be realized. Still furthermore, even in a repair device, a welder and a surface modifier that use laser beam, by improving the output stability and the positional stability of the laser beam, processing accuracy and processing speed can be appreciably improved. Thus, the invention contributes to the development of industries in which laser devices are applied.

What is claimed is:

1. A laser device, comprising:
   a composite laser rod comprising:
      a laser rod comprising a laser active element; and
      a skin layer at a periphery of the laser rod and in which particles in an interface with the laser rod are integrated with the laser rod;
   wherein a diameter of the laser rod provides mode control of a laser beam that is oscillated in the composite laser rod;
   wherein the laser rod and the skin layer are made of cubic system materials and have no anisotropy in thermal expansion; and
   wherein the refractive index of the laser rod is at least 0.3% higher than that of the skin layer.

2. A laser device as set forth in claim 1, further comprising a cooling mechanism which cools the laser rod.

3. A laser device as set forth in claim 1, further comprising:
- a wavelength conversion element through which the laser beam passes;
- wherein an aspect ratio of the beam positional stability in the laser beam outputted from the wavelength conversion element approaches one to one.

4. A laser device as set forth in claim 1, wherein the laser rod and the skin layer have thermal expansion coefficients which are within 10% of one another.

5. A laser device as set forth in claim 1, wherein the thermal conductivity of the skin layer is higher than the thermal conductivity of the laser rod.

6. A laser device as set forth in claim 1, wherein the laser rod is a single crystal.

7. A laser device as set forth in claim 1, wherein the laser beam is oscillated in a single mode.

8. A laser device as set forth in claim 1, wherein the skin layer is a ceramic material that does not contain a laser active element.

9. A laser device as set forth in claim 1, wherein the skin layer is made of a material having a garnet structure.

10. A laser device as set forth in claim 1, wherein the skin layer is made of a material having a composition of $Re_2O_3$ that is an oxide of a trivalent positive ion Re.

11. A laser device as set forth in claim 1, wherein the laser rod is made of a ceramic material.

12. A laser device as set forth in claim 1, wherein the laser rod is made of a material having a composition of $Re_2O_3$ that is an oxide of a trivalent positive ion Re.

13. A laser device as set forth in claim 1, wherein the laser rod is made of either one of a single crystal material and a ceramic material that have a composition of Nd-doped yttrium aluminum garnet to which at least one of lutetium and gallium is added.

14. A laser device as set forth in claim 1, wherein a rod made of a ceramic material that does not contain a laser active element is bonded to at least one end of the composite laser rod.

15. A laser device as set forth in claim 2, wherein frequencies of the cooling mechanism and frequencies of the laser rod do not match.

* * * * *